United States Patent [19]

Maebayashi et al.

[11] Patent Number: 4,478,430

[45] Date of Patent: Oct. 23, 1984

[54] STRUT TYPE VEHICLE SUSPENSION MECHANISM

[75] Inventors: Jiro Maebayashi; Shoji Kasai, both of Hiroshima, Japan

[73] Assignee: Toyo Kogyo Co., Ltd., Hiroshima, Japan

[21] Appl. No.: 436,793

[22] Filed: Oct. 26, 1982

[30] Foreign Application Priority Data

Oct. 29, 1981 [JP] Japan ................. 56-173293

[51] Int. Cl.³ .............................. B60G 3/06
[52] U.S. Cl. ................... 280/690; 180/73.3; 280/660; 280/724
[58] Field of Search ............... 280/690, 93, 701, 660, 280/724; 180/73.3

[56] References Cited

U.S. PATENT DOCUMENTS 3,876,029 4/1975 Von Der Omr .............. 280/690
4,046,403 9/1977 Yoshida ..................... 280/701

FOREIGN PATENT DOCUMENTS 2035307 1/1972 Fed. Rep. of Germany ...... 280/690
153115 12/1980 Japan.

Primary Examiner—Joseph F. Peters, Jr.
Assistant Examiner—Kenneth R. Rice
Attorney, Agent, or Firm—Fleit, Jacobson, Cohn & Price

[57] ABSTRACT

A vehicle suspension mechanism including a carrier for carrying a rear wheel rotatably about an axis of rotation, a strut assembly having an upper end connected with a vehicle body and a lower end connected with the carrier, a swingable arm pivotably connected through resilient rubber bushes with the vehicle body at a longitudinally spaced first forward point and a first rearward point and with the carrier at a longitudinally spaced second forward point and a second rearward point, the first rearward point being at a higher level than a plane defined by the remaining three points so that a toe-in movement is produced when the arm is upwardly swung.

6 Claims, 5 Drawing Figures

STRUT TYPE VEHICLE SUSPENSION MECHANISM

The present invention relates to a motor vehicle suspension mechanisms and more particularly to strut type vehicle suspension mechanisms.

Strut type suspension mechanisms include swingable link arms having one end pivotably connected with the vehicle body and the other end pivotably connected with a carrier rotatably carrying a wheel. Strut assemblies comprised of oleo struts and compression springs are disposed between the vehicle bodies and the carriers so that the strut assemblies are part of the suspension link mechanisms. This type of suspension mechanism is considered advantageous in that points of attachment of the link arms and the strut assembly to the vehicle body are spaced apart by substantial distances so that the impact load from the wheel is transmitted to the vehicle body in a widely distributed manner and therefore the body is not likely to be subjected to a concentrated load. Further, the camber angle and the caster angle of the wheel become less sensitive to manufacturing errors because of the fact that the aforementioned points of attachment are widely spaced apart from each other. It should however be noted that this type of suspension mechanism has not been satisfactory in respect of road gripping characteristics and various moving characteristics under acceleration, deceleration and turning movement of the vehicle. For example, when a vehicle is running through a curved path, it is desirable to produce a toe-in movement in the outward rear wheel in order to prevent or moderate the possible tendency of over-steering. It is further desirable to produce a camber angle change in the outward wheels in order to ensure a satisfactory road gripping characteristics. Under deceleration of the vehicle, it is also desirable to produce toe-in movements in wheels to ensure stabilization of steering. Conventional strut type suspension mechanisms, however, have not been satisfactory to produce such desirable movements in the wheels.

In view of these problems, there is proposed by the U.S. Pat. No. 4,046,403 issued on Sept. 6, 1977 to H. Yoshida, a strut type suspension mechanism with which a toe-in movement can be produced in a wheel under a rearwardly directed longitudinal force or an inwardly directed side force. According to the proposal, there is provided a wheel carrier for rotatably carrying a wheel and a swingable arm is pivotably attached to the vehicle body at two longitudinally spaced apart points and to the wheel carrier at two longitudinally spaced apart points. A strut assembly is provided between the wheel carrier and the vehicle body. By properly determining the points of attachment of the swingable arm to the vehicle body and to the wheel carrier, it is possible to produce the aforementioned toe-in movement in the wheel. It should however be noted that in the proposed arrangement, it is impossible to produce a toe-in movement under a bumped condition in which the swingable arm is upwardly swung although such toe-in movement is also desirable particularly in the outward rear wheel to prevent a tendency of vehicle oversteering during operation through a curved path.

It is therefore an object of the present invention to provide a strut suspension mechanism in which desirable movements can be produced in the wheel under various operating conditions.

Another object of the present invention is to provide a strut type suspension mechanism in which a toe-in movement can be produced in the wheel under a bumped condition.

According to the present invention, the above and other objects can be accomplished by a vehicle suspension mechanism including carrier means for carrying a wheel rotatably about an axis of rotation, strut means having an upper end connected with a vehicle body and a lower end connected with said carrier means, swingable arm means pivotably connected with said vehicle body at a longitudinally spaced first forward point and a first rearward point and with said carrier means at a longitudinally spaced second forward point and a second rearward point, said first rearward point being at a higher level than a plane defined by the remaining three points. It is preferable to provide at each point of connection of the swingable arm to the body or the carrier a resilient member such as a rubber bush. In the mechanism in accordance with the present invention, a toe-in movement is produced in the wheel when the swingable arm means is upwardly swung with respect to the vehicle body.

The mechanism in accordance with the present invention can advantageously be applied to a rear suspension because, in such a case, when the vehicle is passing through a curved path, the outward rear wheel and the swingable arm associated therewith will be forced upwardly with respect to the vehicle body under centrifugal force and a desirable toe-in movement will be produced in the outward rear wheel to thereby provide steering stability.

The above and other objects and features of the present invention will become apparent from the following descriptions of preferred embodiments taking reference to the accompanying drawings, in which.

Figure 1:
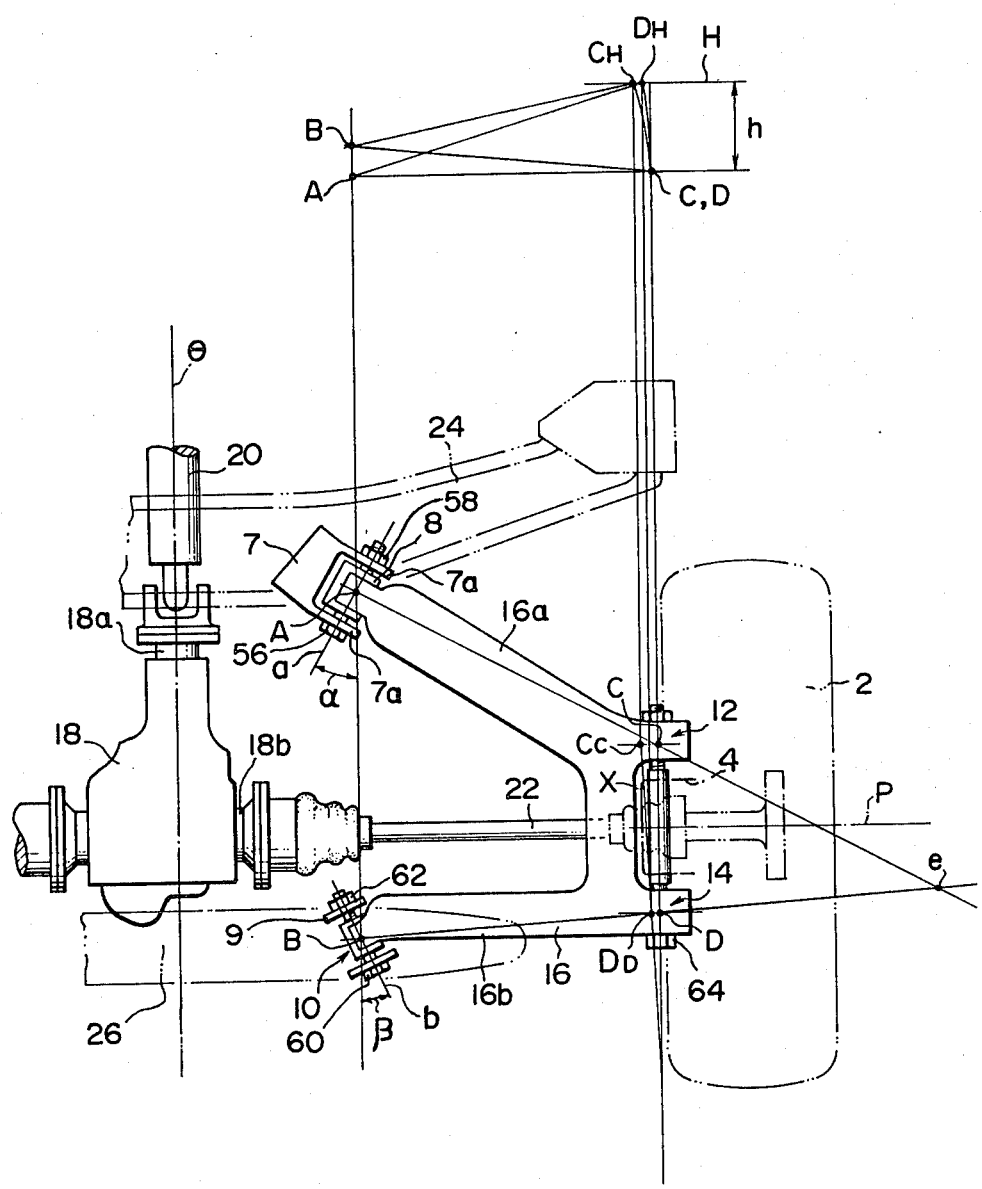
FIG. 1 is a plan view of a rear suspension mechanism in accordance with one embodiment of the present invention.
Figure 2:
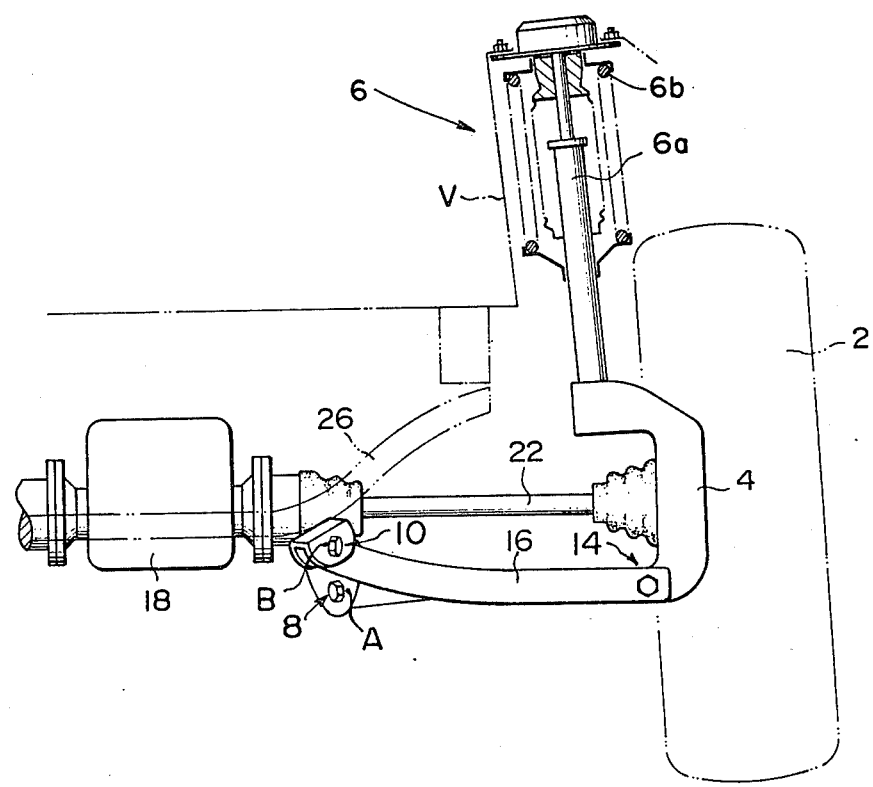
FIG. 2 is a rear view of the suspension mechanism shown in FIG. 1.
Figure 3:
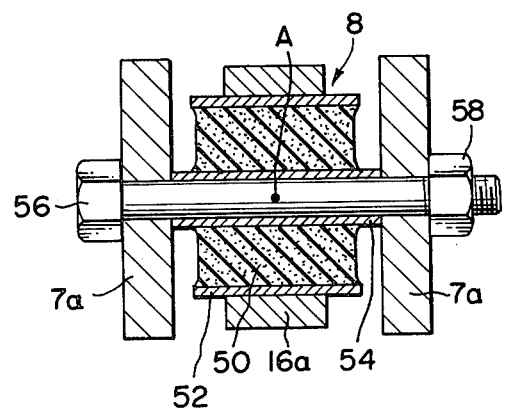
FIG. 3 is a sectional view showing one example of a resilient rubber bush.

Referring to the drawings, and particularly to FIGS. 1 and 2, there is shown a rear suspension mechanism including a carrier 4 which carries a rear wheel 2 for rotation about its axis P. A strut assembly 6 comprised of an oleo strut 6a and a coil spring 6b is connected at the lower end to the upper portion of the carrier 4. The upper end of the strut assembly 6 is attached to a vehicle body V. A swingable arm 16 is provided and has bifurcated arm levers 16a and 16b which are spaced apart from each other in the longitudinal direction. The forward arm lever 16a is connected through a resilient rubber bush 8 with a bracket 7 provided on a front sub-frame 24 which is attached to the vehicle body through suitable rubber mounts (not shown). As shown in FIG. 3, the rubber bush 8 is constituted by a resilient rubber 50 adhesively attached to an outer tube 52 and an inner tube 54. The outer tube 52 is welded to the free end of the arm lever 16a whereas the inner tube 54 is inserted between a pair of flanges 7a of the bracket 7. A connecting bolt 56 is inserted through the flanges 7a and the inner tube 54 and a nut 58 is engaged with the bolt 56. As shown in FIG. 1, the rubber bush 8 has a longitudinal axis a which is inclined by an angle α rearwardly and inwardly with respect to a longitudinal center line O of the vehicle body V. As shown in FIG. 3, the rubber bush 8 has a center A about which the arm lever 16a is pivotable.

The rear arm lever 16b is connected through a resilient rubber bush 10 with a bracket 9 which is provided on a rear sub-frame 26 attached to the vehicle body V through suitable rubber mounts (not shown). The resilient rubber bush 10 is of the same structure as the bush 8 is and has a center B which corresponds to the center A in the rubber bush 8. The rubber bush 10 is connected to the bracket 9 by means of a bolt 60 and a nut 62 and has a longitudinal axis b inclined by an angle β forwardly and inwardly with respect to the longitudinal center line O of the body V.

The swingable arm 16 is provided at the outward end portion with a pair of rubber bushes 12 and 14 which are longitudinally spaced apart from each other as shown in FIG. 1. The rubber bushes 12 and 14 are of the same structures as the bush 8 is and have centers C and D, respectively. The rubber bushes 12 and 14 are axially aligned and a through-bolt 64 is inserted through the bushes 12 and 14 and the carrier 4 for pivotably connecting the arm 16 with the carrier 4. In the illustrated embodiment, the vertical plane containing the centers A and B of the rubber bushes 8 and 10 is parallel with the longitudinal center line θ of the body V. Similarly, the centers C and D of the rubber bushes 12 and 14 are located in a vertical plane parallel with the longitudinal center line θ. There is provided a differential gear unit 18 which has an input shaft 18a connected with a propeller shaft 20. The output shaft 18b of the differential gear unit 18 is connected through an axle 22 with the rear wheel 2.

As shown in FIG. 2 and also diagrammatically in the upper part of FIG. 1, the rubber bushes 12 and 14 are located so that their centers C and D are positioned in the same height whereas the bush 10 is located at a higher position than the bush 8. In other words, the center B of the rubber bush 10 is at a higher position than a plane defined by the centers A, C and D of the rubber bushes 8, 12 and 14. Further, as shown in FIG. 1, a line passing through the centers A and C intersects a vertical plane containing the centers B and D at a point e which is located rearwardly of the axis P of the wheel 2. It should therefore be noted in the diagram shown in the upper part of FIG. 1 that, when the swingable arm 16 is upwardly swung to shift the centers C and D of the rubber bushes 12 and 14, the center C is moved substantially along an arc of a circle having a center at the point A but the center D is moved along an arc of a circle having a center at the point B which is higher in level than the point A. Therefore, the center C is moved to the point $C_H$ and the center D to the point $D_H$. In the plan view of FIG. 1, these points $C_H$ and $D_H$ correspond to points $C_C$ and $D_D$, respectively, so that a toe-in movement is produced in the wheel 2 as shown by a line X.

Figure 4:
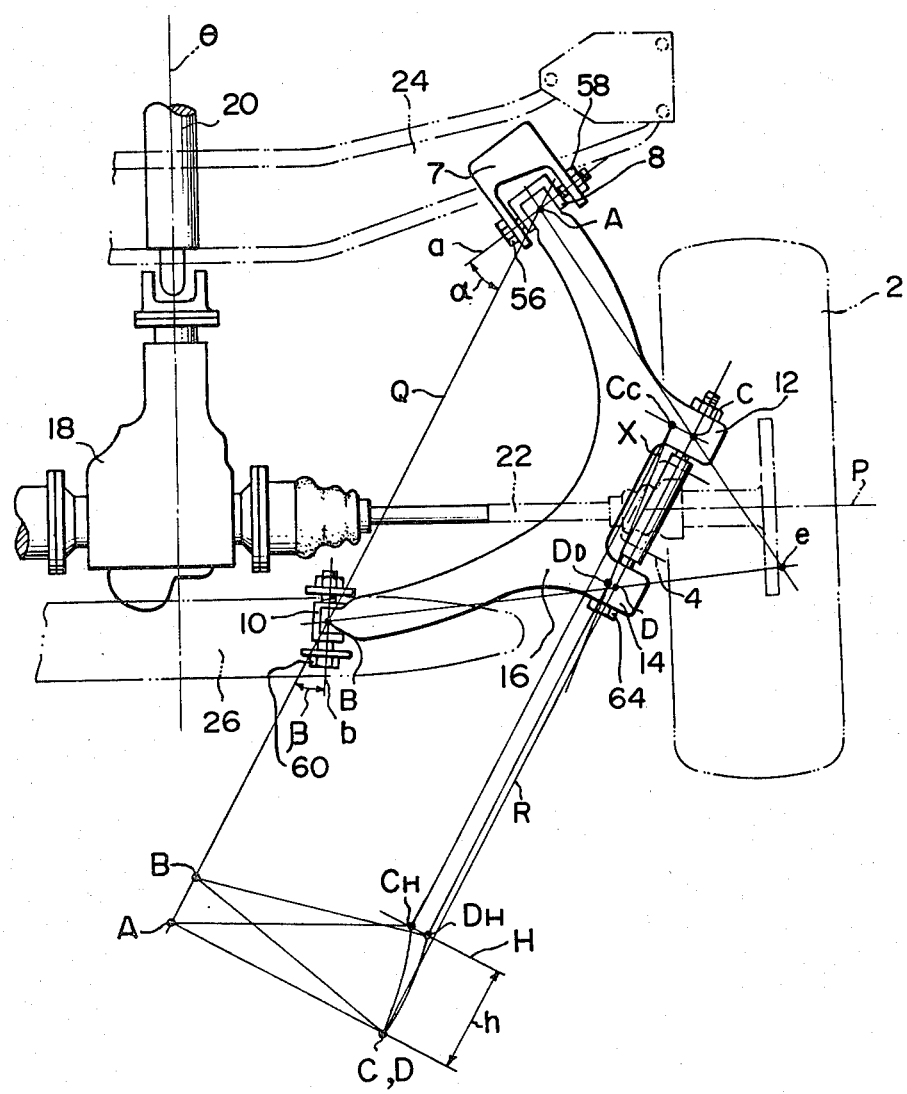
FIG. 4 is a plan view similar to FIG. 1 but showing another embodiment.
Figure 5:
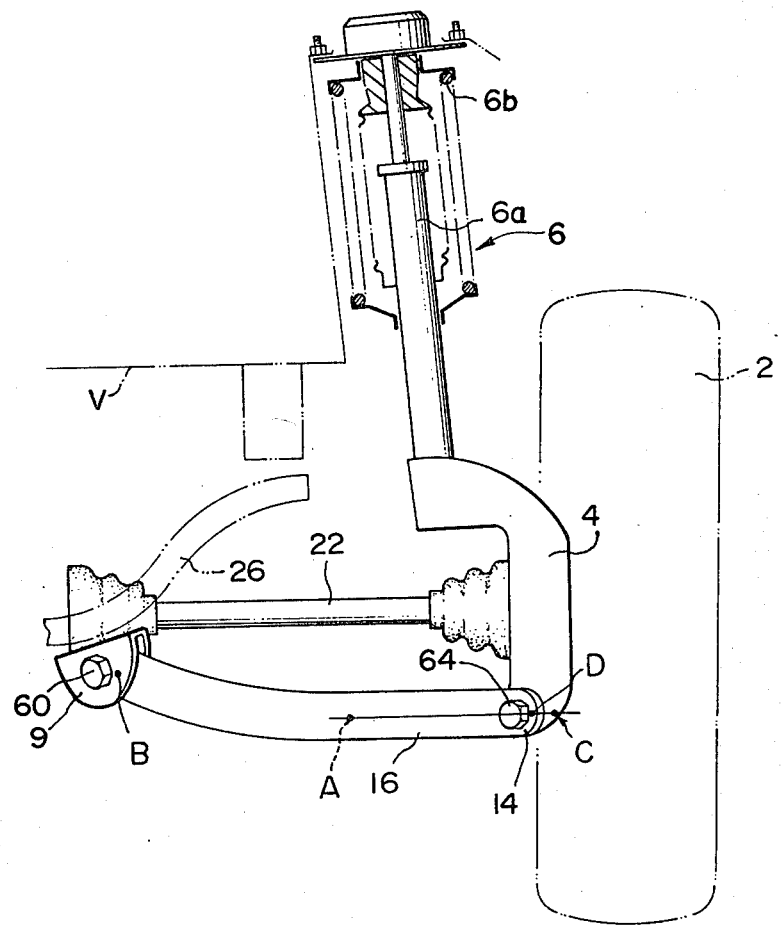
FIG. 5 is a rear view of the mechanism shown in FIG. 4.

Referring now to FIGS. 4 and 5, there is shown another embodiment of the present invention. This embodiment is basically the same as the previous embodiment so that corresponding parts are designated by the same reference numerals as in the previous embodiment. In this embodiment, the vertical plane Q containing the centers A and B of the rubber bushes 8 and 10 is not parallel with the longitudinal center line θ of the body V but is inclined so that the bush 8 is located at a transversely outward position with respect to the rubber bush 10. The bush 8 has an axis a which makes an angle α with the plane Q. The axis b of the rubber bush 10 makes an angle β with the plane Q. The centers C and D of the rubber bushes 12 and 14 are in a vertical plane R which is parallel with the plane Q. In other respects, the arrangements are the same as in the previous embodiment so that detailed descriptions will be omitted. In this embodiment, too, a toe-in movement of the wheel 2 will be produced when the arm 16 is swung upwardly.

In the embodiments described above, the rubber bushes 8, 12 and 14 are arranged so that their centers A, C and D are in a horizontal plane. However, it should be noted that they need not be in a horizontal plane, but the only requirement is that the inward rear rubber bush B is located higher than the plane containing the remaining three rubber bushes 8, 12 and 14.

The invention has thus been shown and described with reference to specific embodiments. However, it should be noted that the invention is in no way limited to the details of the illustrated structures but changes and modifications may be made without departing from the scope of the appended claims.

We claim:

1. A vehicle suspension mechanism including carrier means for carrying a rear wheel rotatably about an axis of rotation, strut means having an upper end connected with a vehicle body and a lower end connected with said carrier means, swingable arm means pivotally connected through resilient means with said vehicle body at a first forward point and a first rearward point, said first forward front spaced longitudinally from said first rearward point, and with said carrier means at a second forward point and a second rearward point, said second forward point spaced longitudinally from said second rearward point, said first rearward point being at a higher level than a plane defined by the remaining three points.

2. A vehicle suspension mechanism in accordance with claim 1 in which said resilient means includes a rubber bush provided at each of said first forward and rearward points comprised of an inner and outer tubes connected with a cylindrical rubber element.

3. A vehicle suspension mechanism in accordance with claim 2 in which each of the rubber bushes has a center and a longitudinal axis inclined with respect to a line connecting the centers of the rubber bushes at the first forward and rearward points.

4. A vehicle suspension mechanism in accordance with claim 2 in which said first forward and rearward points are located in a vertical plane which is parallel with a longitudinal center line of the vehicle body.

5. A vehicle suspension mechanism in accordance with claim 2 in which said first forward and rearward points are located in a plane which is inclined forwardly and outwardly with respect to a longitudinal center line of the vehicle body.

6. A vehicle suspension mechanism in accordance with claim 5 in which each rubber bush has a center and a longitudinal axis inclined with respect to a line connecting the centers of the rubber bushes at the first forward and rearward points, an axle shaft being connected with said rear wheel for transmitting a driving torque thereto.

* * * * *